US010788952B2

(12) United States Patent
Whelan (10) Patent No.: US 10,788,952 B2
(45) Date of Patent: Sep. 29, 2020

(54) SYSTEM AND METHOD FOR OBTAINING RESOURCE MATERIALS BASED ON ATTRIBUTE ASSOCIATION

(71) Applicant: The Boeing Company, Chicago, IL (US)

(72) Inventor: John Desmond Whelan, Burien, WA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 15/990,900

(22) Filed: May 29, 2018

(65) Prior Publication Data

US 2019/0369818 A1    Dec. 5, 2019

(51) Int. Cl.
| | |
|---|---|
| *G06F 3/048* | (2013.01) |
| *G06F 3/0482* | (2013.01) |
| *G06F 3/0481* | (2013.01) |
| *G09B 5/02* | (2006.01) |
| *G09B 19/00* | (2006.01) |
| *G06F 3/0488* | (2013.01) |

(52) U.S. Cl.
CPC .......... *G06F 3/0482* (2013.01); *G06F 3/0488* (2013.01); *G06F 3/04815* (2013.01); *G09B 5/02* (2013.01); *G09B 19/00* (2013.01)

(58) Field of Classification Search
CPC ...... B60R 2300/105; B60R 2001/1253; B60K 37/06; B60K 2370/21; G09B 5/02; G06F 3/012; G06F 3/013; G06F 3/014
See application file for complete search history.

(56) References Cited

U.S. PATENT DOCUMENTS

| | | | |
|---|---|---|---|
| 2002/0022956 A1* | 2/2002 | Ukrainczyk | G06F 17/218 704/9 |
| 2003/0028527 A1* | 2/2003 | Crosby | G06F 16/9535 |
| 2004/0066329 A1* | 4/2004 | Zeitfuss | G01S 5/0018 342/357.31 |
| 2010/0107077 A1* | 4/2010 | Hanawa | G06Q 10/06393 715/716 |
| 2016/0140393 A1* | 5/2016 | Schneider | G06K 9/00671 382/103 |
| 2018/0124213 A1* | 5/2018 | Wood | H04W 4/023 |

\* cited by examiner

*Primary Examiner* — Claudia Dragoescu
(74) *Attorney, Agent, or Firm* — Coats + Bennett, PLLC (57) ABSTRACT

A tablet computing device displays training content to a user. Upon detecting the user-selection of a term in the content, the tablet computing device identifies one or more categories that are associated with the selected term and obtains additional training resources related to the user-selected term based on those categories. Additionally, the tablet computing device captures the image of a vehicle, such as an aircraft, within its field of view for display to the user. Given the image, the tablet computing device identifies areas on the vehicle that may be related to the user-selected term and generates touch controls for those areas. The user can touch those controls to retrieve the additional training resources.

20 Claims, 10 Drawing Sheets

SYSTEM AND METHOD FOR OBTAINING RESOURCE MATERIALS BASED ON ATTRIBUTE ASSOCIATION

TECHNICAL FIELD

The present disclosure relates generally to tablet computing devices, and particularly to tablet computing devices configured to display the content of a digital training course to a user.

BACKGROUND

Due, in part, to their mobility and functionality, tablet computing devices can easily be used in a variety of situations. One such use, for example, is as a training aid configured to present digital training course-related content to a user. In these types of situations, an institution providing training courses typically stores course-related content in digital form in a memory of a computing device. The tablet computing device displays the training content to the user upon retrieval from the memory. So displayed, the user can read the training content, and in some cases, follow embedded links to other training content.

BRIEF SUMMARY

Aspects of the present disclosure provide a tablet computing device configured to display the content of a training course to a user, and to identify and obtain training resources and information related to one or more categories associated with terms in the training course content that have been dynamically selected by the user. In some aspects, the tablet computing device also utilizes the geographical location of the tablet computing device to identify the locations on a vehicle, such as an aircraft, for example, of objects (e.g., equipment) related to one or more categories associated with the dynamically selected terms.

In one aspect, a tablet computing device comprises a display, a lens assembly, and a processing circuit. The processing circuit is configured to determine a category for a user-selected term on the display, output an image of a vehicle positioned in a field of view of the lens assembly to the display, and determine a reference point for the vehicle. The processing circuit is also configured to generate a 3-dimensional (3D) coordinate system for the vehicle relative to the reference point and, based on the 3D coordinate system, identify one or more areas of interest on the vehicle. Each area of interest comprises a corresponding object related to the category. So identified, the processing circuit is configured to visually indicate the one or more areas of interest on the image of the vehicle being displayed to a user.

In one aspect, to determine a category for a user-selected term on the display, the processing circuit is configured to determine one or more attribute values for the user-selected term responsive to receiving user input selecting the user-selected term on the display and identify the category for the user-selected term based on a comparison between the one or more attribute values for the user-selected term and one or more attribute values associated with the category.

In some aspects, the processing circuit is configured to weight a value associated with the category according to a user-defined prioritization scheme.

In one aspect, the tablet computing device further comprises a camera. In these aspects, to output an image of a vehicle positioned in a field of view of the lens assembly to the display, the processing circuit is configured to control the camera to capture an image of an area within the field of view of the lens assembly responsive to detecting the user selecting the user-selected term on the display, and output the image to the display.

In one aspect, the processing circuit is further configured to determine a current geographical location of the tablet computing device.

In one aspect, the tablet computing device further comprises a Global Positioning Satellite (GPS) receiver configured to determine the current geographical location of the tablet computing device.

In one aspect, the tablet computing device further comprises a wireless transceiver configured to receive the current geographical location of the tablet computing device via a communications network.

In one aspect, to determine a reference point for the vehicle, the processing circuit is configured to determine an identity of the vehicle being displayed to the user based on the current geographical location of the tablet computing device, determine a current geographical location of the vehicle based on the identity of the vehicle, and determine the reference point based on the current geographical location of the vehicle. In these aspects, the reference point indicates a point of origin for the 3D coordinate system generated for the vehicle.

In one aspect, to identify the one or more areas of interest on the vehicle, the processing circuit is configured to calculate a corresponding geographical location for each of the one or more areas of interest relative to the reference point.

In one aspect, to visually indicate the one or more areas of interest on the image of the vehicle being displayed to the user, the processing circuit is configured to generate a corresponding touch area defining each of the one or more areas of interest, visually emphasize each corresponding touch area on the display, retrieve information related to the object associated with a first touch area responsive to detecting the user selecting the first touch area, and display the information related to the object associated with a first touch.

In one aspect, the present disclosure provides a method of identifying resource information associated with training course. The method is implemented on a tablet computing device and comprises receiving user input selecting a term displayed on a display of the tablet computing device, and responsive to receiving the user input, determining a category for the term selected by the user. Additionally, responsive to receiving the user input, the method also comprises outputting an image of a vehicle positioned in a field of view of the tablet computing device, determining a reference point for the vehicle, generating a 3-dimensional (3D) coordinate system for the vehicle relative to the reference point, and identifying one or more areas of interest on the vehicle based on the 3D coordinate system. Each area of interest comprises a corresponding object related to the category. Additionally, the method further comprises visually indicating the one or more areas of interest on the image of the vehicle being displayed to a user.

In one aspect, determining a category for the term selected by the user comprises determining one or more attribute values for the term selected by the user responsive to receiving the user input, comparing the one or more attribute values for the term selected by the user to one or more attribute values associated with the category, and identifying the category for the term selected by the user based on a result of the comparison.

In one aspect, a value associated with the category is weighted according to a user-defined prioritization scheme.

In one aspect, outputting an image of a vehicle positioned in a field of view of the tablet computing device comprises capturing an image of an area within the field of view of the tablet computing device, and outputting the image to a display of the tablet computing device.

In one aspect, the method further comprises determining a current geographical location of the tablet computing device.

In one aspect, determining a reference point for the vehicle comprises identifying the vehicle being displayed to the user based on the current geographical location of the tablet computing device, determining a current geographical location of the vehicle based on the identity of the vehicle, and computing the reference point based on the current geographical location of the vehicle, wherein the reference point indicates a point of origin for the 3D coordinate system generated for the vehicle.

In one aspect, identifying one or more areas of interest on the vehicle comprises calculating a corresponding geographical location for each of the one or more areas of interest relative to the reference point.

In one aspect, visually indicating the one or more areas of interest on the image of the vehicle being displayed to a user comprises, for each of the one or more areas of interest, generating a touch area defining the area of interest and visually emphasizing the touch area on the display. The method then comprises retrieving information related to the object associated with a first touch area responsive to detecting the user selecting the first touch area, and displaying the information related to the object associated with the first touch area.

In one aspect, the method further comprises overlaying the 3D coordinate system and one or more visually emphasized touch areas on the image of the vehicle being displayed to the user.

In one aspect, the present disclosure provides a non-transitory computer-readable medium that stores a computer program product. The computer program product is configured to control a tablet computing device and comprises software instructions that, when executed by processing circuitry of the tablet computing device, causes the processing circuitry to receive user input selecting a term being displayed on a display of the tablet computing device. Responsive to receiving the user input, the software instructions executed by the processing circuitry causes the processing circuitry to determine a category for the term selected by the user, output an image of a vehicle positioned in a field of view of a lens assembly of the tablet computing device to the display, determine a reference point for the vehicle, generate a 3-dimensional (3D) coordinate system for the vehicle relative to the reference point, and, based on the 3D coordinate system, identify one or more areas of interest on the vehicle. Each area of interest comprises a corresponding object related to the category. Additionally, the software instructions executed by the processing circuitry causes the processing circuitry to visually indicate the one or more areas of interest on the image of the vehicle being displayed to a user.

BRIEF DESCRIPTION OF THE DRAWINGS

Aspects of the present disclosure are illustrated by way of example and are not limited by the accompanying figures with like references indicating like elements.

DETAILED DESCRIPTION

Aspects of the present disclosure provide a tablet computing device configured to display digital training content to a user, and to obtain and display additional information related to the displayed training content based on user input and location. More particularly, the tablet computing device displays training course content to a user on a display. As the user views the content, the user can select one or more terms on the display. The terms may comprise, for example, words and/or phrases associated with additional information that the user is interested in learning about. In response to the user's selection, the tablet computing device determines one or more categories associated with the selected term(s), and then uses values assigned those categories to identify one or more resources related to the user-selected term. The tablet computing device also determines its own geographical location, captures an image of a vehicle within its field of view, identifies that vehicle based at least in part on the geographical location of the tablet computing device, and displays the captured image on the display. So displayed, the tablet computing device determines the physical locations of one or more areas on the vehicle having objects related to the selected terms, and that may be of interest to the user, and visually indicates those areas on the display to the user. The user is then able to select a visually indicated area of interest to obtain information and resources specifically associated with that area of interest.

A tablet computing device configured according to the aspects of the present disclosure provides benefits that conventional tablet computing devices either do not provide or are unable to provide. For example, conventional tablet computing devices obtain additional information based on "static" connections. That is, a user viewing content for a given piece of equipment, for example, can re-direct to other content simply by selecting an embedded link that points specifically to that related content. However, such static links are limiting. In particular, the static links are predefined and relate to content selected by a creator of the training material, but that may not be of particular interest to the user. Thus, with conventional systems, users are limited by the ability of the course creator to guess at which particular aspects of the training material a user might be interested. Tablet computing devices configured according to aspects of the present disclosure, however, dynamically connect the various categories that may be associated with the training content being displayed to the user, and thus, dynamically connect the resources associated with the training content being displayed to the user. Such dynamic connections allow users to easily navigate between a wider variety of resources related to the training material based on content that the user deems interesting rather than on what the course creator thinks might be interesting to the user.

Further, because of the static nature of embedded links, conventional tablet computing devices are only configured to obtain and display information already stored in memory. Currently, conventional devices are not configured to visually indicate areas of interest related to a dynamically selected portion of training content with respect to a vehicle that is currently in the user's field of view. Moreover, conventional devices are not configured to display such resources in connection with a vehicle that is dynamically identified by the tablet computing device. Aspects of the present disclosure, however, utilize the geographical location of the tablet computing device to identify a given vehicle or type of vehicle currently in the field of view, and based on that identification, identify locations on that vehicle associated with resources that may be of interest to the user based on an analysis of the term or terms dynamically and arbitrarily selected by the user. Such capabilities broaden the usefulness of the training platform for the user and make it easier for the user to identify and locate areas of interest related to the content currently being viewed.

Figure 1:
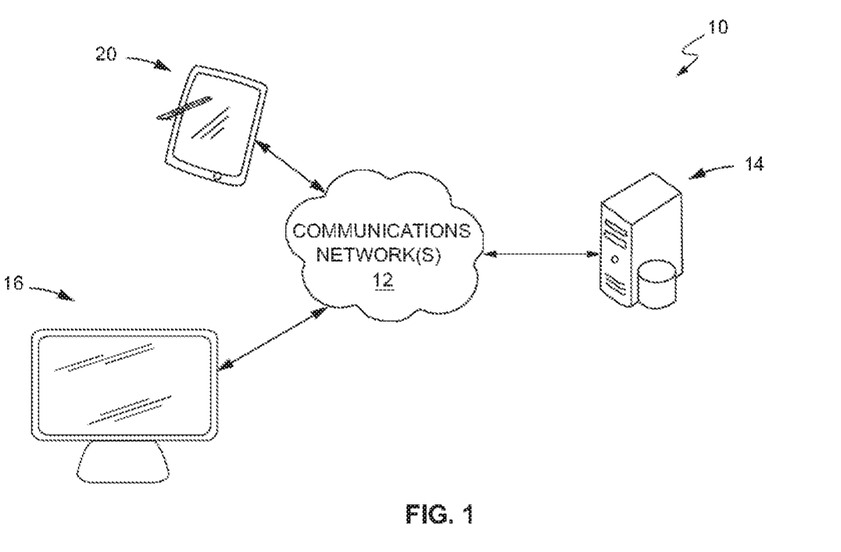
FIG. 1 is a functional block diagram illustrating a communications network configured according to one aspect of the present disclosure.

Turning now to the drawings, FIG. 1 is a functional block diagram illustrating a system 10 configured according to one aspect of the present disclosure. As seen in FIG. 1, system 10 comprises one or more communications networks 12 communicatively connecting a network server 14, a desktop computer 16, and a tablet computing device 20.

Communications networks 12 can comprise any public and/or private communications networks known in the art. In this aspect, however, communications networks 12 comprise one or more private and/or public computer networks configured to communicate data as packets between network server 14, desktop computer 16, and tablet computing device 20. While not an exhaustive list, such computer networks include, but are not limited to, the Internet, an Intranet, and any Ethernet-based network configured to communicate packet data using, for example, TCP/IP. In some aspects, communications networks 12 also comprise one or more wireless cellular communications networks. Such networks, which are widely known in the art, are particularly useful in aspects where tablet computing device 20 comprises a mobile device having cellular capabilities.

Desktop computer 16 can comprise any type of personal computing device known in the art. According to aspects of the present disclosure, desktop computer 16 is employed to provision the data utilized by tablet computing device 20. More specifically, a user can provision network server 14 with the training material displayed on tablet computing device 20. This includes the actual digital content of a given training course, as well as one or more categories and attributes associated with the content, and that are utilized in identifying one or more additional training resources related to that content.

In some aspects, desktop computer 16 is also configured to process data as part of the provisioning process to prepare that data for use by the tablet computing device 20. For example, in one aspect, desktop computer 16 is configured to receive data associated with the training course material and convert or transform that data into corresponding objects prior to storing the information in memory accessible to tablet computing device 20 and/or network server 14. Each object comprises its own set of attributes describing the various characteristics of that object and is associated with one or more categories of objects. As described in more detail later, aspects of the present disclosure utilize these categories, along with some user-defined criteria, in a comparison to identify additional training resources that may be of interest to a user, as well as to identify the locations of certain equipment and/or objects associated with those training resources on a given vehicle.

Tablet computing device 20 (commonly referred to as a "tablet") comprises any mobile personal computing device configured to be easily and conveniently held and carried by a user. As is known by those of ordinary skill in the art, tablet computing devices 20 typically have a touch-sensitive display screen, a wireless-capable communications interface, an internal, rechargeable power source (e.g., a battery), a camera, and a mobile operating system (OS) configured to control the operations of tablet computing device 20. According to aspects of the present disclosure, tablet computing device 20 is configured to obtain and display the digital content of a training course to a user, receive user input selecting various terms within the displayed content, and analyze the selected terms to identify one or more categories of objects that are most likely closely associated with the user-selected term. Additionally, tablet computing device 20 is configured to determine its own geographical location, identify a vehicle within its field of view based on that geographical location, output an image of the vehicle to the display, and visually indicate one or more areas of interest associated with the user-selected term on the displayed image of the vehicle.

FIGS. 2A-2F are perspective views of a tablet computing device 20 configured to implement such functions according to one aspect of the present disclosure. It should be understood that the aspects seen in these figures, which are merely illustrative, assume that a user has provisioned the training course materials, and that the training course content has been processed by one or both of the desktop computer 16 and the network server 14 for storage in memory.

Figure 2A:
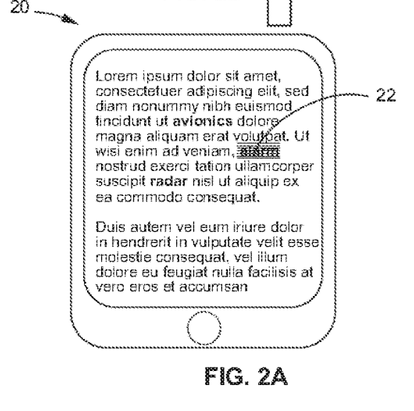
FIGS. 2A-2F are example views of a tablet computing device configured to function according to one aspect of the present disclosure.
Figure 2B:
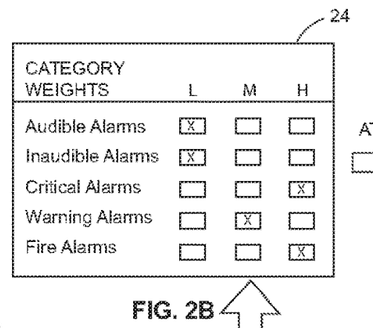

As seen in FIG. 2A, tablet computing device 20 is configured to display the contents of a training course to a user on its touch-sensitive display. As is conventional, the user is able to scroll through the displayed content to read and interact with the course materials. In some cases, however, the user may wish to obtain additional resources and training materials that are related to, or associated with, the content of the training materials currently being displayed. By way of example, consider a user currently interacting with a training course related to the maintenance of emergency doors on aircraft. While reading the displayed content, the user may wish to find additional resources regarding the different alarms on an aircraft. Therefore, the user selects a term 22 "alarm" on the display by touching that term 22 with a stylus or finger. Upon detecting the user-selection of term 22, aspects of the present disclosure determine the various categories for the user-selected term 22. In one aspect, for example, the present disclosure first determines one or more attributes that are associated with the user-selected term 22 and compares them to attributes associated with one or more categories of objects stored in memory. In the context of the present disclosure, "attributes" comprise value pairs, for example, that are utilized to construct or describe an object. Aspects of the disclosure then "weight" corresponding values associated with those one or more categories in accordance with a predefined prioritization scheme (e.g., such as the prioritization scheme is illustrated in FIG. 2B as table 24).

There are various methods by which aspects of the present disclosure determine the one or more categories that are associated with the user-selected term 22. In one aspect, for example, tablet computing device 20 is configured to execute an application program (e.g., a machine-readable computer control program) that retrieves data (e.g., attribute values) associated with one or more different categories. Such data may be retrieved from memory resident on tablet computing device 20, from memory associated with a network device, such as network server 14, or from some other device communicatively connected to tablet computing device 20. Tablet computing device 20 then determines which categories may be associated with the user-selected term 22 based on an analysis of the attributes associated with the user-selected term 22 and the data retrieved from memory. Aspects of the disclosure then weight values associated with those categories in accordance with the predefined prioritization scheme and determine one or more additional resources (e.g., additional training courses) based on the weighted category values, as previously described.

In other aspects, however, tablet computing device 20 does not determine the one or more categories. Rather, network server 14 performs this function upon receiving a request from the tablet computing device 20. In these aspects, network server 14 implements the attribute analysis and provides tablet computing device 20 with information identifying the one or more categories that are associated with the user-selected term 22. In other aspects, determining the one or more categories associated with the user-selected term 22 is performed by both the tablet computing device 20 and network server 14, with one of those devices implementing some of the functions and the other of those devices implementing other functions.

As seen in this aspect, the user-selected term 22 "alarm" is associated with one or more categories such as "audible alarms," "inaudible alarms," "critical alarms," "warning alarms," and "fire alarms." Of course, other categories are possible, but regardless of the particular category, or the number of categories associated with user-selected term 22, each category has an assigned value, such as a value pair. Such values may be assigned, for example, during the provisioning process and updated as needed or desired. Further, each category is prioritized according to the importance to the user. Thus, if the user previously indicated that critical alarms and fire alarms were the most important categories to consider when identifying course material related to those categories, those categories values would be multiplied, for example, by the highest weight value. The category having the lowest priority to the user, which in this aspect are audible and inaudible alarms, would be multiplied by a value having a lower weight value. The actual values utilized are not germane to the present disclosure. However, regardless of the particular weighting values, weighting the category values helps to ensure that the user is provided with the most relevant course material.

Figure 2C:
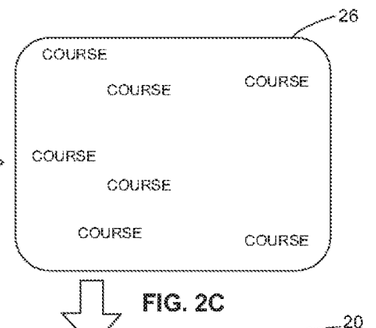
Figure 2D:
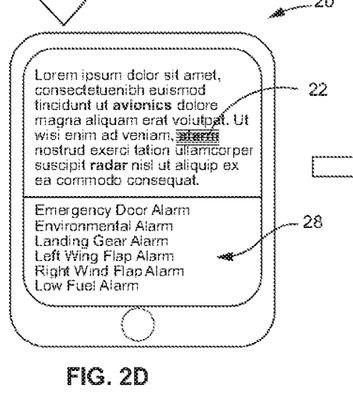

Once the weighted category values have been obtained, aspects of the present disclosure compare those one or more categories for the user-selected term 22 to other categories in order to obtain the corresponding resources for the user. As seen in FIG. 2C, aspects of the present disclosure identify one or more other training courses 26 based on the results of that comparison. The identified courses can then be displayed to the user by tablet computing device 20 as a list 28 of selectable links, as illustrated in FIG. 2D, for example.

Figure 2E:
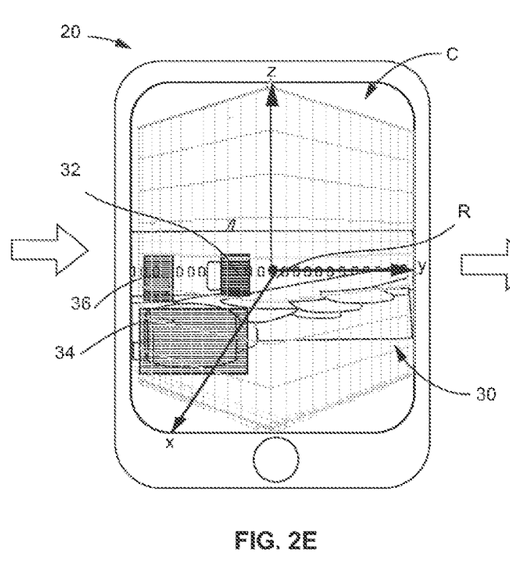

In one aspect, seen in FIG. 2E, however, the tablet computing device 20 also enables its camera responsive to detecting the user selection of term 22. In this aspect, tablet computing device 20 captures an image of a vehicle, such as aircraft 30, within its field of view of the camera and displays that image to the user. Tablet computing device 20 also determines its own geographical location and uses that information to identify the locations of one or more "areas of interest" on the vehicle. Such "areas of interest" are those areas that are related to the category associated with the user-selected term 22, and are of interest, or are likely to be of interest, to the user.

Particularly, vehicles such as aircraft 30 typically report their current geographical locations (e.g., location coordinates) along with other information. Such information, including the coordinates identifying the current location of aircraft 30, is usually maintained in a database as attributes, and therefore, the location of a given aircraft 30 is generally known. In this aspect, therefore, tablet computing device 20 is configured to match its own geographical location to the known current location of aircraft 30 and, provided the result falls within some specified tolerance, identify aircraft 30 based on that comparison. In situations where the geographical locations of multiple aircraft 30 are the same or similar to each other (e.g., multiple aircraft 30 parked at an airport), any of a variety of known image recognition techniques can be utilized to assist in the process of identifying the aircraft 30 or type of aircraft 30 in the image displayed on tablet computing device 20.

Once aircraft 30 is identified, tablet computing device 20 identifies the locations of one or more areas of interest on the image of aircraft 30. To accomplish this function, one aspect of the present disclosure first determines a reference point R for the aircraft 30, and then generates a 3D coordinate system C based on that reference point R. In some aspects, although it is not required, tablet computing device 20 can overlay the generated 3D coordinate system C onto the image of aircraft 30 displayed by tablet computing device 20.

In this aspect, reference point R is utilized as the origin of the coordinate system and indicates a center of the aircraft 30. However, as those of ordinary skill in the art will readily appreciate, the present disclosure is not so limited. The reference point R may be used to indicate any point on the 3D coordinate system C and need not coincide with the location of the center of aircraft 30.

Figure 2F:
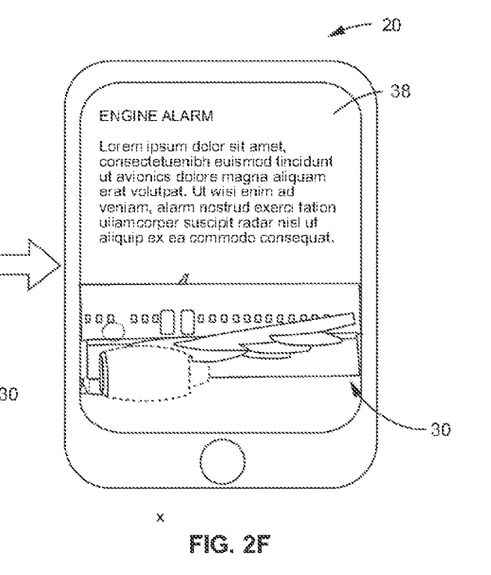

Once the 3D coordinate system C has been generated, tablet computing device 20 visually indicates one or more areas of interest on the image of aircraft 30 being displayed to the user. In the aspect of FIG. 2E, for illustrative purposes, there are three different areas of interest visually indicated to the user, each of which is related to the category of the user-selected term 22 "alarm." The first area of interest 32 is related to the alarm on the door of aircraft 30. The second area of interest 34 is related to the alarm on the engine of aircraft 30. The third area of interest 36 is related to the alarm on the landing gear of aircraft 30. Regardless of the particular type of area interest, or the number of areas of interest, however, tablet computing device 20 is configured to generate and display a corresponding touch-sensitive control area for each area of interest 32, 34, 36 such that they visually emphasize their respective area of interest 32, 34, 36 to the user. So indicated, the user can simply touch a desired area of interest to select the alarm associated with that area, such as the engine alarm associated with area of interest 34, for example, to cause tablet computing device 20 to retrieve information 38 related to that alarm. Once retrieved, tablet computing device 20 outputs the information 38 to the display, as seen in FIG. 2F. The user is then able to read the material associated with the alarm in which the user is interested.

Figure 3:
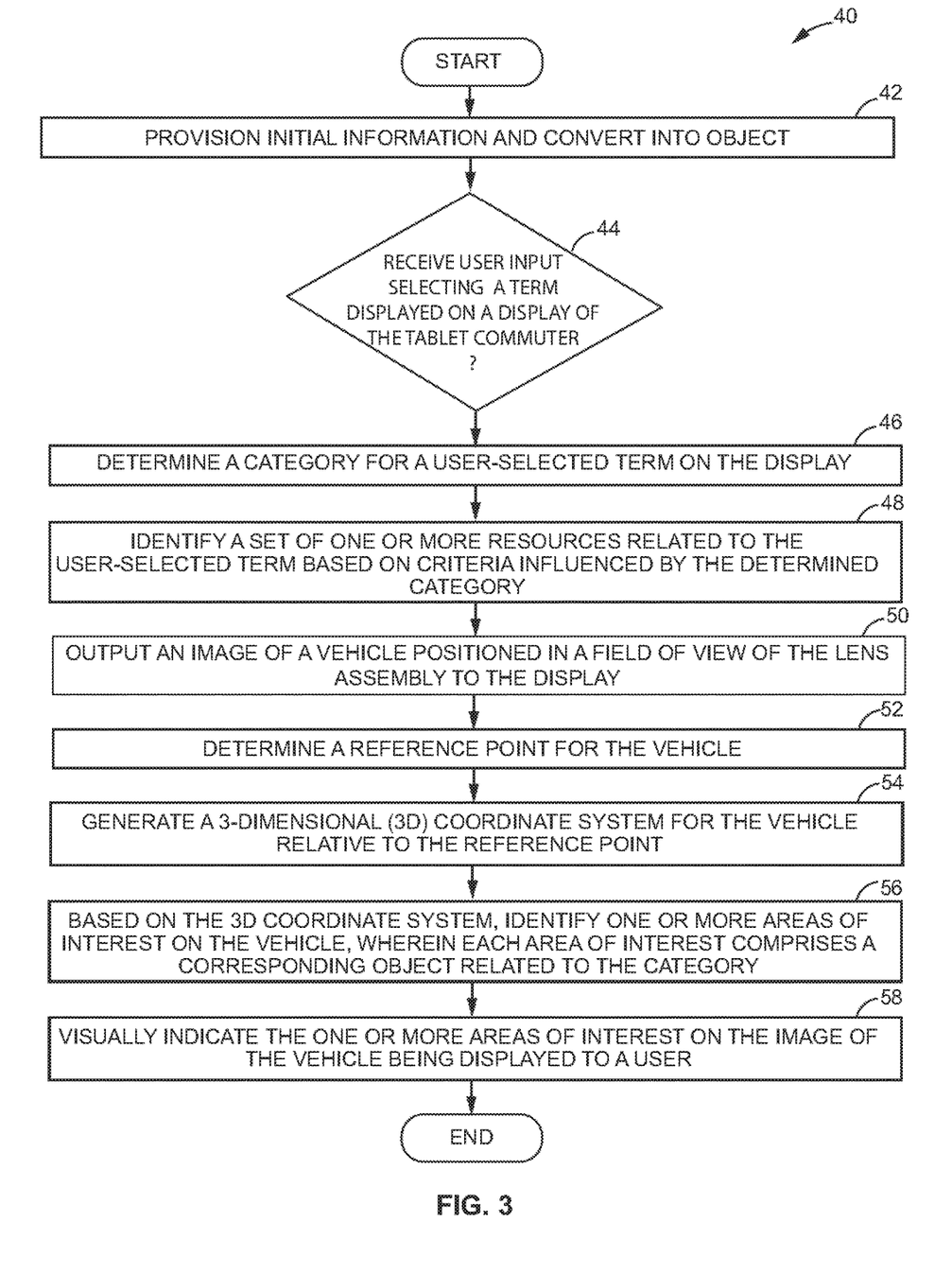
FIG. 3 is a flow chart illustrating a method of presenting digital training-related content to a user of a tablet computing device according to one aspect of the present disclosure.

FIG. 3 is a flow chart illustrating a method 40 of presenting training content to a user of a tablet computing device according to one aspect of the present disclosure. In this aspect, method 40 is implemented by tablet computing device 20. However, this is for illustrative purposes only. In other aspects, method 40 may be implemented partially, or entirely, at network server 14 and/or at desktop computer 16.

As seen in FIG. 3, method 40 begins with the provisioning of an initial set of information regarding various training courses, attributes, weighting values, and the like (box 42). In some aspects, such provisioning can be performed using tablet computing device 20; however, in many cases, the user provisions the initial set of information utilizing desktop computer 16 or network server 14 accessible via other devices such as tablet computing device 20. Regardless of the particular device used for provisioning, however, the information is converted into objects. The conversion process may be accomplished using any known method, and further, may be performed by the desktop computer 16, tablet computing device 20, and/or network server 14. The generated objects are stored in a memory and, as previously described, facilitate the process of comparing attribute values when identifying the categories that are related to a given user-selected term 22, and when determining the geographical location of a vehicle currently in the field of view of tablet computing device 20.

Method 40 then waits to receive user input selecting a term 22 displayed on tablet computing device 20 (box 44). Responsive to detecting such user input, tablet computing device 20 determines a category for the user-selected term 22 (box 46). In one aspect, tablet computing device 20 uses the category to influence criteria used to determine a set of resources (e.g., other training courses) related to the user-selected term 22 and identifies those additional resources to the user (box 48). Tablet computing device 20 then captures an image of a vehicle, such as aircraft 30, for example, and outputs the image to the touch-sensitive display of the tablet computing device 20 (box 50). In one aspect, the vehicle is within the field of view of the camera of tablet computing device 20. Tablet computing device 20 then determines reference point R for the vehicle (box 52) and generates the 3D coordinate system C relative to the reference point R (box 54). Then, based on the 3D coordinate system, tablet computing device 20 identifies one or more areas of interest on the vehicle (box 56) and visually indicates those areas on the image of the vehicle being displayed to the user (box 58).

Figure 4:
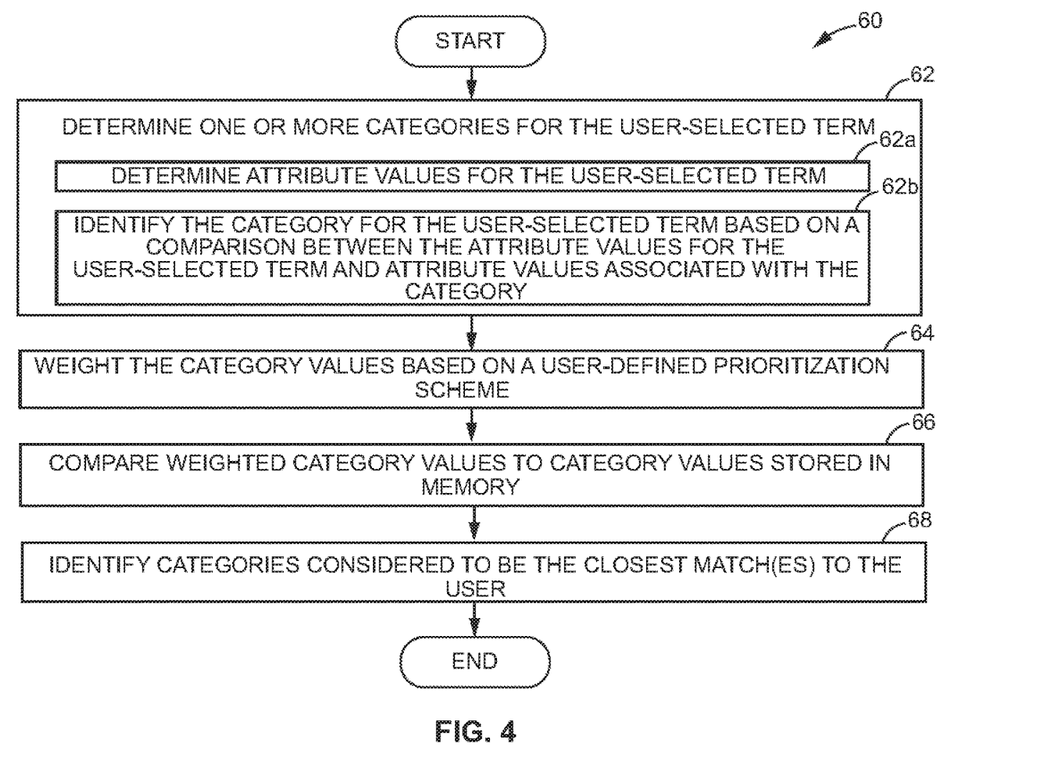
FIG. 4 is a flow chart illustrating a method of identifying a category for a training-related term displayed to and selected by a user according to one aspect of the present disclosure.

There are a number of ways to identify categories for the user-selected term 22 according to the present disclosure. FIG. 4, for example, illustrates one aspect in which method 60 calls for tablet computing device 20 to determine the one or more categories for the user-selected term 22 (box 62). For example, one aspect of the disclosure identifies one or more attribute values associated with the user-selected term 22 responsive to receiving user input selecting the user-selected term on the display (box 62a), and then compares the attribute values associated with the user-selected term 22 with the attributes of the various categories stored in memory (62b). Once determined, method 60 calls for tablet computing device 20 to "weight" the categories (box 64).

More particularly, values associated with the category for the user-selected term 22 in one aspect of the disclosure are weighted according to a user-specified prioritization scheme that ranks the importance of the categories to the user. The data ranking the category values is stored in a table such as table 24. The weighted category values for the user-selected term 22 are then compared to the category values of the various categories stored in memory (box 66). The closest matches between the category values, given a predetermined threshold variance, are identified to the user as being the categories associated with the user-selected term 22 (box 68).

Figure 5:
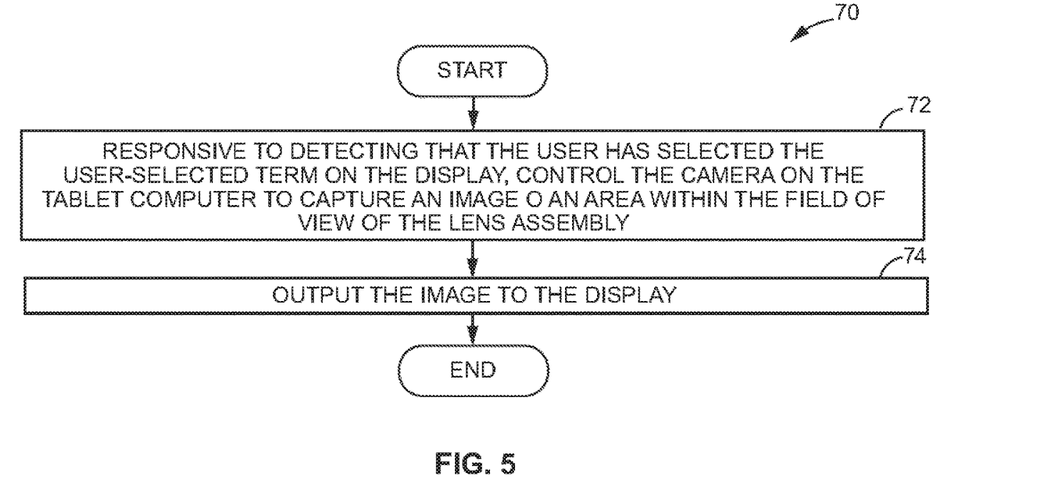
FIG. 5 is a flow chart illustrating a method of activating camera circuitry on a tablet computing device according to one aspect of the present disclosure.

FIG. 5 is a flow diagram illustrating a method 70 for capturing an image of a vehicle and displaying that image on tablet computing device 20 according to one aspect of the disclosure. As seen in FIG. 5, tablet computing device 20 controls a camera integrated with, or connected to, tablet computing device 20 to capture an image of the vehicle (e.g., aircraft 30) that is currently within its field of view (box 72). In this aspect, capturing the image is performed automatically responsive to detecting the user-selection of term 22. So captured, the image is output to the display of tablet computing device 20 (box 74).

Figure 6:
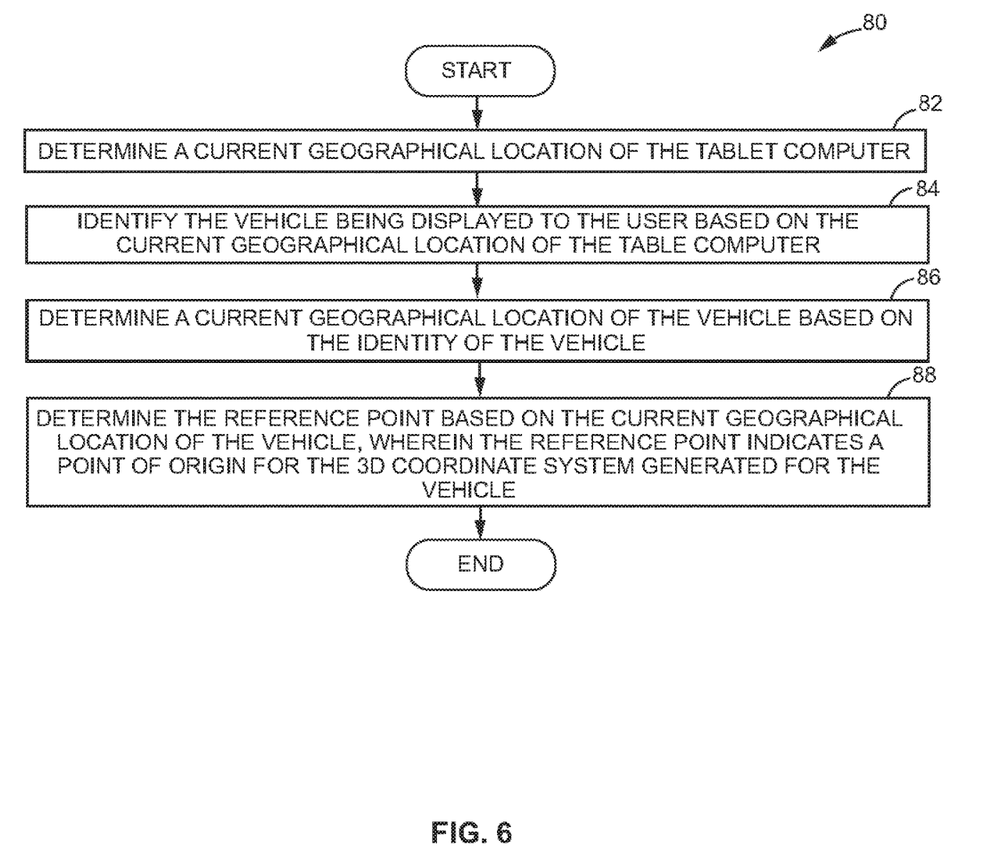
FIG. 6 is a flow chart illustrating a method of generating a 3-dimensional (3D) coordinate system for a vehicle displayed by a tablet computing device according to one aspect of the present disclosure.

FIG. 6 is a flow chart illustrating a method 80 of generating 3D coordinate system C for the aircraft 30 displayed on tablet computing device 20 according to one aspect of the present disclosure. As seen in FIG. 6, method 80 begins with tablet computing device 20 determining its own current geographical location (box 82). In one aspect, a suitably equipped tablet computing device 20 accomplishes this function using an integrated GPS receiver. In aspects where tablet computing device 20 does not include GPS capabilities, tablet computing device 20 can determine its current geographical location using assistance data received from a cellular network, for example, or in any other manner known in the art. Regardless of how tablet computing device 20 determines its current geographical location, however, tablet computing device 20 utilizes this location information to identify the particular aircraft 30 that is currently in its field of view (box 84).

As previously stated, most, if not all aircraft 30, report their own current geographical locations to a centralized location. This information, therefore, can be retrieved and stored as an attribute of aircraft 30. Because the aircraft 30 is within the field of view of tablet computing device 20, it can be safely assumed that the current geographical location of the tablet computing device 20 and the current geographical location of aircraft 30 are the same, or are at least very near each other (e.g., within a predetermined distance threshold). A comparison of the current geographical location of the tablet computing device 20 to those aircraft locations stored in memory, therefore, allows the tablet computing device 20 to identify the particular aircraft 30 that is within the field of view of tablet computing device 20.

In some aspects, there may be many aircraft 30 that are proximate the user, such as when the user is physically located at an airport or some other facility, for example. Thus, it is possible for multiple aircraft 30 to have a current geographical location that is within the predetermined distance threshold. In these cases, tablet computing device 20 is configured to further analyze the image in order to properly identify the aircraft 30. In some aspects, tablet computing device 20 can be configured to display a list identifying the multiple aircraft possibilities to the user. In response, the user could select the appropriate aircraft on the list, thereby positively identifying the aircraft 30 that is currently within the field of view of tablet computing device 20.

Regardless, of how tablet computing device 20 identifies the particular aircraft 30 being displayed to the user, tablet computing device 20 can identify the current geographical location of aircraft 30 based on the stored geographical location information for aircraft 30 (box 86). Once the location of the aircraft 30 has been determined, tablet computing device 20 determines a reference point R for aircraft 30 (box 88) for generating the 3D coordinate system C. The reference point R, in one aspect, is positioned at or near a center of aircraft 30 and indicates a point of origin O for the 3D coordinate system C generated for aircraft 30.

Figure 7:
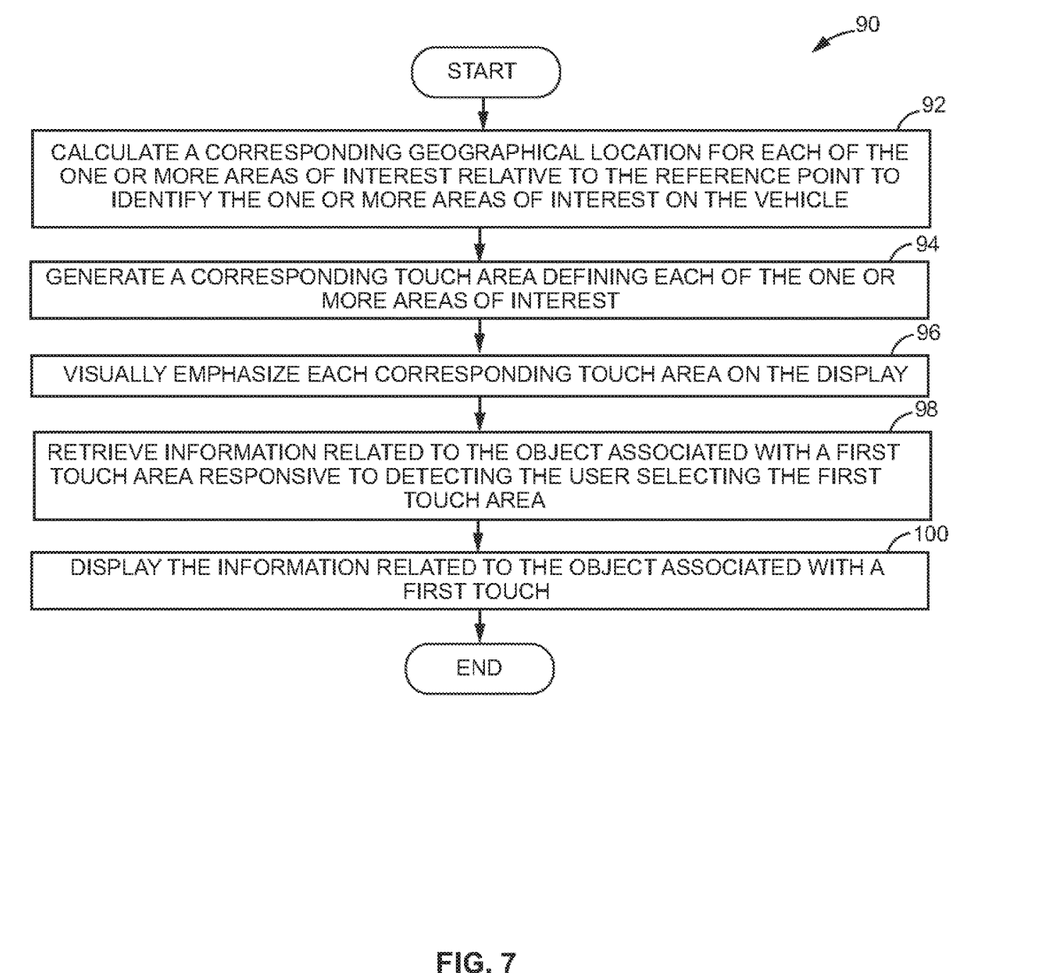
FIG. 7 is a flow chart illustrating a method of determining locations of one or more areas of interest on a vehicle displayed on the tablet computing device according to one aspect of the present disclosure.

FIG. 7 is a flow chart illustrating a method 90 of determining the locations of the identified one or more areas of interest 32, 34, 36 on aircraft 30 according to one aspect of the present disclosure. As seen in FIG. 7, method 90 begins with tablet computing device 20 calculating a corresponding geographical location for each of the areas of interest 32, 34, 36 relative to the reference point R (box 92). Because the identity of aircraft 30 is known, or at least the type of aircraft 30 that is within the field of view of tablet computing device 20, so, too, are the dimensions of aircraft 30. Further, the distances of the particular areas of interest 32, 34, 36 are also known. In one aspect, for example, the attributes associated with the aircraft 30 include the various areas of interest that are associated with aircraft 30, as well as a distance of those areas from the reference point R. Therefore, in one aspect, tablet computing device 20 is configured to compute the geographical locations for each area of interest 32, 34, 36 relative to the reference point R.

As those of ordinary skill in the art will understand, the distances of one or more of the areas of interest 32, 34, 36 from the reference point R can be relatively small in the context of geographical locations. Therefore, in some cases, determining a geographical location for a given area of interest may not be entirely helpful. In cases such as these, or where tablet computing device 20 does not have the ability to discern between closely-spaced GPS coordinates, tablet computing device 20 is configured to identify the locations of some or all of the areas of interest 32, 34, 36 based on the known distances and directions of the areas if interest 32, 34, 36 from the reference point R.

Once the locations of the areas of interest 32, 34, 36 are identified, however, tablet computing device 20 generates a touch area control for each area of interest 32, 34, 36 (box 94). Methods for generating such controls are well-known to those of ordinary skill in the art, and thus, are not discussed in detail here. It is sufficient to explain, though, that tablet computing device 20 is configured to display each generated touch area control such that it visually emphasizes its corresponding area of interest 32, 34, 36 (box 96). In one aspect, seen previously in FIG. 2E, for example, the touch area controls comprise highlighted control areas shaped as boxes with each touch area control substantially surrounding its corresponding area of interest 32, 34, 36.

The touch area controls allow the user to obtain information about the object associated with the particular area of interest 32, 34, 36. For example, referring to FIG. 2E, a user interested in obtaining information related to an engine alarm (e.g., additional training materials or courses) simply touches the visually emphasized area of interest 34 with a finger or stylus. In response to the user selection, tablet computing device 20 retrieves the information related to the selected area of interest (box 98) and outputs that information to the display of tablet computing device 20 (box 100).

Thus, with a tablet computing device 20 configured according to the aspects of the disclosure, users working through the training material on one subject, for example, are able to quickly and easily identify one or more other possible areas of interest that are closely and meaningfully related to the training material they are currently viewing. For example, a user working through training material on aircraft "alarms" in general can quickly and easily obtain training materials on other, more specific alarms on an aircraft. Further, once identified, the users are able to quickly and easily obtain the training materials for those identified areas of interest based, in part, on their current geographical location.

Moreover, the tablet computing device 20 is sized to be carried by the user and is equipped with a camera. As such, tablet computing device 20 is beneficially configured to utilize the physical, real-world objects that are the subject of the user's interest. More specifically, with a tablet computing device configured according to the present disclosure, users are able to walk freely around a given location, if needed, to find an aircraft 30 (or other vehicle) that comprises the physical object the user is interested in learning about. Having the physical object to view while simultaneously reviewing the training material for that object makes the tablet computing device 20 of the present disclosure an extremely beneficial training aid.

Figure 8:
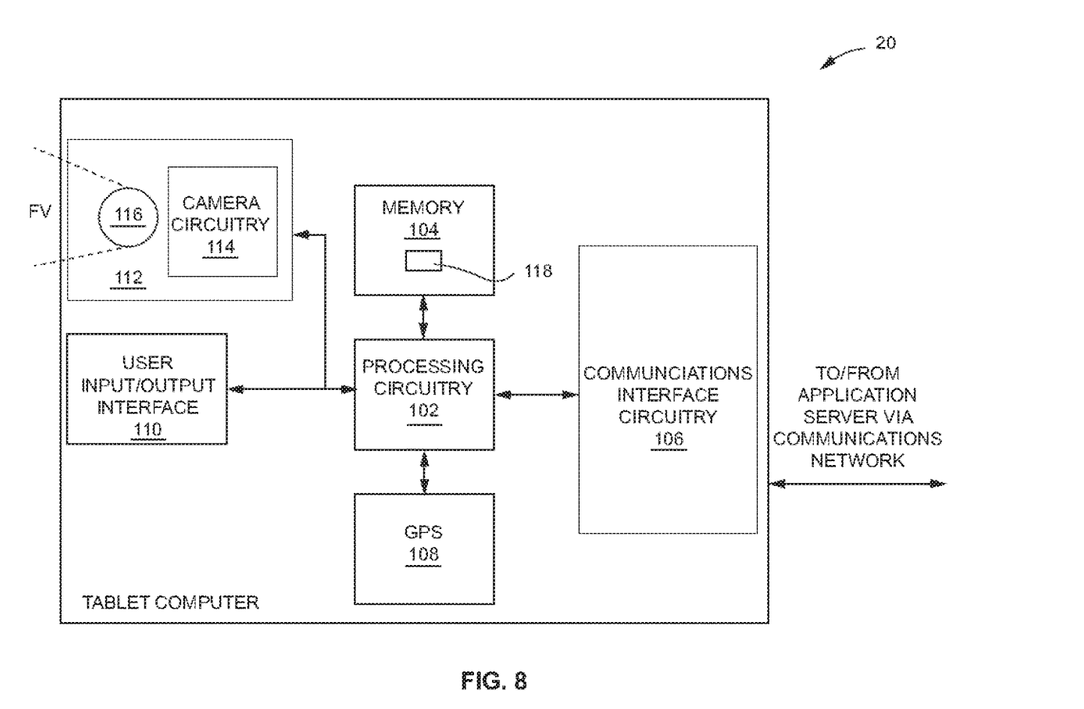
FIG. 8 is a functional block diagram illustrating some components of a tablet computing device configured according to one aspect of the present disclosure.

FIG. 8 is a functional block diagram illustrating some components of a tablet computing device 20 configured according to one aspect of the present disclosure. Particularly, in this aspect, tablet computing device 20 comprises processing circuitry 102 communicatively coupled to memory 104, communications interface circuitry 106, global positioning satellite (GPS) circuitry 108, a user input/output (I/O) interface 110, and a camera 112. Processing circuitry 102 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. According to the present disclosure, processing circuitry 102 includes programmable hardware capable of executing software instructions stored, e.g., as a machine-readable computer control program 118 in memory 104.

More particularly, processing circuitry 102 is configured to execute the computer control program 118 to implement the previously described aspects. Such implementation includes controlling the tablet computing device 20 to determine one or more categories for a user-selected term 22, controlling camera 112 to capture an image of a vehicle in the field of view of tablet computing device 20, outputting an image of the vehicle to the user I/O interface 110 (e.g., a touch sensitive display), determining its own geographical location and that of the vehicle, determining a reference point R for the vehicle, and generating, based on the reference point R, a 3D coordinate system C to overlay onto the image of the vehicle. Additionally, processing circuitry 102 is also configured to identify one or more areas of interest 32, 34, 36 on the vehicle, and visually indicate those areas on the image of the vehicle to the user.

Communications interface circuitry 106 is configured to facilitate the communication of data and information between the tablet computing device 20 and network server 14 via the one or more communications networks 12. In some aspects of the present disclosure, communications interface circuitry 106 includes a transceiver configured to send and receive cellular communication signals to and from the network server 14 via a base station associated with the one or more communications networks 12 to retrieve information from, and send information to, the network server 14. In other aspects, communications interface circuitry 106 includes an ETHERNET card or similar network interface card (NIC) which permits tablet computing device 20 to communicate data packets with the network server 14.

The GPS circuitry 108 comprises the hardware and software required for locating the current geographical location of the tablet computing device 20, as previously described. In one aspect, GPS circuitry 108 determines the current location of tablet computing device 20 and reports that location information to processing circuitry 102. Upon receipt, processing circuitry 102 utilizes that location information to perform the various aspects of the present disclosure, as previously described.

The user I/O interface 110 comprises circuitry configured to allow a user to interface with tablet computing device 20, and in this aspect, is implemented as a unitary physical component with tablet computing device 20. In one aspect, user I/O interface 110 includes, but is not limited to, display devices such as a Liquid Crystal Display (LCD) and/or a Light Emitting Diode (LED) display for presenting visual information to a user, one or more graphics adapters, display ports, video buses, a touch sensitive display screen, a graphical processing unit (GPU), and audio output devices such as speakers, as well as circuitry and devices for accepting input from a user. Such circuitry and devices include, for example, a stylus.

Camera 112 comprises camera circuitry 114 and a lens assembly 116 and is controlled in one or more aspects of the present disclosure by processing circuitry 102 to capture digital images of an object within the field of view FV of lens assembly 116. More particularly, camera circuitry 114 comprises various circuits, filters, and sensor arrays, and functions to control the operation of camera 112 responsive to commands and data received from processing circuitry 102. Such control includes, but is not limited to, the autonomous activation and deactivation of camera 112, the autonomous control of the lens assembly 116 to properly focus on the particular object in the field of view FV, and the autonomous processing required to digitize the captured image for output to the display of the user I/O interface 110.

Figure 9:
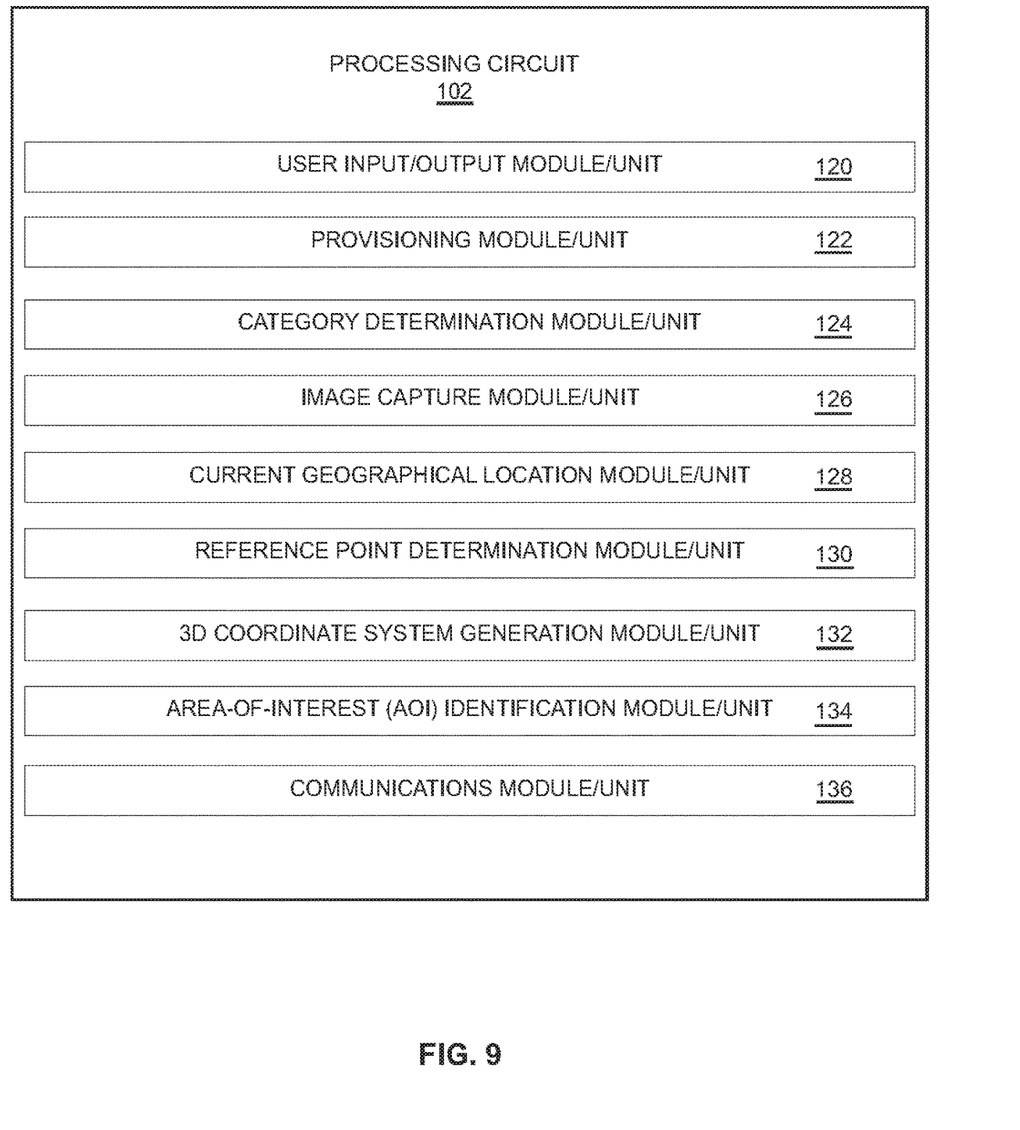
FIG. 9 is a functional block diagram illustrating a processing circuit of a tablet computing device configured according to one aspect of the present disclosure.

FIG. 9 is a functional block diagram illustrating processing circuitry 102 implemented according to different hardware units and software modules (e.g., as computer control program 118 stored on memory 104) according to one aspect of the present disclosure. As seen in FIG. 9, processing circuitry 102 implements a user input/output unit and/or module 120, a provisioning unit and/or module 122, a category determination unit and/or module 124, an image capture unit and/or module 126, a current geographical location determination unit and/or module 128, a reference point determination unit and/or module 130, a 3D coordinate generation unit and/or module 132, an area-of-interest (AOI) identification unit and/or module 134, and a communications unit and/or module 136.

The user input/output unit and/or module 120 is configured to accept and analyze user input, such as the touches detected when the user is selecting a term 22, as well as to output images and other information to the touch sensitive display screen of the user I/O interface 110. The provisioning unit and/or module 122 is configured to receive information input by the user and to output that information to an appropriate data storage device. As stated above, not all tablet computing devices 20 will be required to provision the data and information upon which category comparisons are performed; however, in aspects where such functions are required by tablet computing device 20, processing circuitry 102 can include the provisioning unit and/or module 122.

The category determination unit and/or module 124 is configured to implement the value comparisons with respect to the attributes and categories, and to determine one or more categories that are associated with user-selected term 22. The image capture unit and/or module 126 is configured to control camera 112 to capture an image of a vehicle within the field of view FV, as previously described, and to provide that image to processing circuitry 102 for output to the display. The current geographical location determination unit and/or module 128 is configured to compute or determine the tablet computing device's 20 current geographical location on the earth's surface. Such may be performed, for example, using GPS circuitry 108, or by receiving and analyzing location information from the one of more communications networks 12. The reference point determination unit and/or module 130 is configured to identify the location for the reference point R on the vehicle, as previously described, and the 3D coordinate generation unit and/or module 132 is configured to generate the 3D coordinate system C based on that reference point R. In one aspect, the 3D coordinate generation unit and/or module 132 generates the 3D coordinate system with reference point R as the origin.

The area-of-interest (AOI) identification unit and/or module 134 is configured to locate the positions of the various areas of interest 32, 34, 36 on the vehicle, generate a corresponding touch sensitive control for each area, and overlay that control on the captured image being displayed to the user so as to visually indicate the location of each area of interest on the display. The communications unit and/or module 136 is configured to send and receive data, signals, and information to and from one or more entities communicatively associated with the one or more communications networks 12. Such entities include, but are not limited to, network servers 14, cellular capable base stations, access points, and the like.

Figure 10:
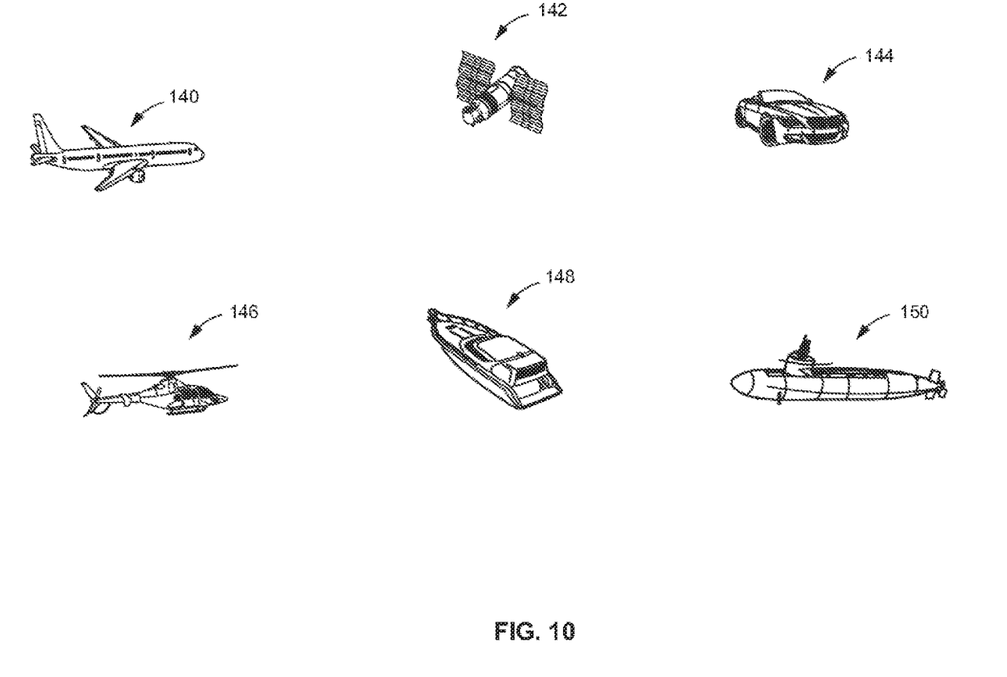
FIG. 10 illustrates some types of vehicles that may be displayed on a display of a tablet computing device configured according to one aspect of the present disclosure.

Aspects of the present disclosure further include various methods and processes, as described herein, implemented using various hardware configurations configured in ways that vary in certain details from the broad descriptions given above. For example, the previously described aspects of the present disclosure relate to the vehicle being an aircraft, such as aircraft 140 seen in FIG. 10. However, those of ordinary skill in the art will readily appreciate that the present disclosure is not so limited. In other aspects of the present disclosure, suitable vehicles include, but are not limited to, satellites 142, automobiles 144, rotor craft 146, water-borne surface vehicles 148, sub-surface vehicles 150, and the like. Additionally, the aspects of the disclosure are described herein as if tablet computing device 20 performs all functionality. However, as those of ordinary skill in the art should readily appreciate, this is merely for illustrative purposes. The functionality described herein may be performed by the tablet computing device 20, but may also be implemented by network server 14 (or some other computing device) alone or in conjunction with tablet computing device 20.

Therefore, the foregoing description and the accompanying drawings represent non-limiting examples of the methods and apparatus taught herein. As such, the aspects of the present disclosure are not limited by the foregoing description and accompanying drawings. Instead, the aspects of the present disclosure are limited only by the following claims and their legal equivalents.

What is claimed is:

1. A tablet computing device comprising:
a display;
a lens assembly;
a camera; and
a processing circuit configured to:
detect user input indicating that a user has selected a user-selected term on the display; and
responsive to detecting the user input:
determine a category for the user-selected term on the display based, in part, on a user-defined prioritization scheme that ranks the importance of one or more categories to the user, wherein the category is associated with one or more values that are weighted according to the user-defined prioritization scheme, and wherein to determine a category for the user-selected term on the display, the processing circuit is configured to:
determine one or more attribute values for the user-selected term; and
identify the category for the user-selected term based on a comparison between the one or more attribute values for the user-selected term and one or more attribute values associated with the category, and on the user-defined prioritization scheme;
control the camera to capture an image of an area within a field of view of the lens assembly;
output the image of a vehicle positioned in the field of view of the lens assembly to the display;
determine a reference point for the vehicle;
generate a 3-dimensional (3D) coordinate system for the vehicle relative to the reference point;
based on the 3D coordinate system, identify one or more areas of interest on the vehicle, wherein each area of interest comprises a corresponding object related to the category; and
visually indicate the one or more areas of interest on the image of the vehicle being displayed to the user.

2. The tablet computing device of claim 1 wherein the processing circuit is further configured to determine a current geographical location of the tablet computing device.

3. The tablet computing device of claim 2 further comprising a Global Positioning Satellite (GPS) receiver configured to determine the current geographical location of the tablet computing device.

4. The tablet computing device of claim 2 further comprising a wireless transceiver configured to receive the current geographical location of the tablet computing device via a communications network.

5. The tablet computing device of claim 2 wherein to determine a reference point for the vehicle, the processing circuit is configured to:
determine an identity of the vehicle being displayed to the user based on the current geographical location of the tablet computing device; and
determine the reference point based on the current geographical location of the vehicle, wherein the reference point indicates a point of origin for the 3D coordinate system generated for the vehicle.

6. The tablet computing device of claim 5 wherein to identify the one or more areas of interest on the vehicle, the processing circuit is configured to calculate a corresponding geographical location for each of the one or more areas of interest relative to the reference point.

7. The tablet computing device of claim 6 wherein to visually indicate the one or more areas of interest on the image of the vehicle being displayed to the user, the processing circuit is configured to:
generate a corresponding touch area defining each of the one or more areas of interest;
visually emphasize each corresponding touch area on the display;
retrieve information related to the object associated with a first touch area responsive to detecting the user selecting the first touch area; and
display the information related to the object associated with a first touch.

8. A method of identifying resource information associated with training course, the method implemented on a tablet computing device and comprising:
receiving user input selecting a term displayed on a display of the tablet computing device; and
receiving user input indicating that a user has selected a user-selected term on the display; and
responsive to receiving the user input:
determining a category for the term selected by the user based, in part, on a user-defined prioritization scheme that ranks the importance of one or more categories to the user, wherein the category is associated with one or more values that are weighted according to the user-defined prioritization scheme, and wherein determining a category for the user-selected term on the display comprises:
determining one or more attribute values for the term selected by the user responsive to receiving the user input;
comparing the one or more attribute values for the term selected by the user to one or more attribute values associated with the category; and
identifying the category for the term selected by the user based on a result of the comparing, and on the user-defined prioritization scheme;
controlling a camera of the tablet computing device to capture an image of an area within a field of view of the tablet computing device;
outputting the image of a vehicle positioned in the field of view of the tablet computing device;
determining a reference point for the vehicle;
generating a 3-dimensional (3D) coordinate system for the vehicle relative to the reference point;
based on the 3D coordinate system, identifying one or more areas of interest on the vehicle, wherein each area of interest comprises a corresponding object related to the category; and
visually indicating the one or more areas of interest on the image of the vehicle being displayed to the user.

9. The method of claim 8 further comprising determining a current geographical location of the tablet computing device.

10. The method of claim 9 wherein determining a reference point for the vehicle comprises:
identifying the vehicle being displayed to the user based on the current geographical location of the tablet computing device;
determining a current geographical location of the vehicle based on the identity of the vehicle; and
computing the reference point based on the current geographical location of the vehicle, wherein the reference point indicates a point of origin for the 3D coordinate system generated for the vehicle.

11. The method of claim 10 wherein identifying one or more areas of interest on the vehicle comprises calculating a corresponding geographical location for each of the one or more areas of interest relative to the reference point.

12. The method of claim 11 wherein visually indicating the one or more areas of interest on the image of the vehicle being displayed to a user comprises:
for each of the one or more areas of interest:
generating a touch area defining the area of interest; and
visually emphasizing the touch area on the display;
retrieving information related to the object associated with a first touch area responsive to detecting the user selecting the first touch area; and
displaying the information related to the object associated with the first touch area.

13. The method of claim 8 wherein the 3D coordinate system and one or more visually emphasized touch areas are overlaid on the image of the vehicle being displayed to the user.

14. A non-transitory computer-readable medium storing a computer program product configured to control a tablet computing device, the computer program product comprising software instructions that, when executed by processing circuitry of the tablet computing device, cause the processing circuitry to:
receive user input selecting a term being displayed on a display of the tablet computing device; and
responsive to receiving the user input:
determine a category for the term selected by the user based, in part, on a user-defined prioritization scheme that ranks the importance of one or more categories to a user, wherein the category is associated with one or more values that are weighted according to the user-defined prioritization scheme, and wherein to determine a category for the user-selected term on the display, the instructions further cause the processing circuit to:
determine one or more attribute values for the term selected by the user; and
identify the category for the term selected by the user based on a comparison between the one or more attribute values for the term selected by the user and one or more attribute values associated with the category, and on the user-defined prioritization scheme;
control a camera of the tablet computing device to capture the image of the vehicle positioned in the field of view of the lens assembly;
output the image of a vehicle positioned in the field of view of a lens assembly of the tablet computing device to the display;
determine a reference point for the vehicle;
generate a 3-dimensional (3D) coordinate system for the vehicle relative to the reference point;
based on the 3D coordinate system, identify one or more areas of interest on the vehicle, wherein each area of interest comprises a corresponding object related to the category; and
visually indicate the one or more areas of interest on the image of the vehicle being displayed to the user.

15. The method of claim 10 wherein determining the current geographical location of the vehicle based on the identity of the vehicle comprises:
retrieving a geographical location reported by the vehicle from a database of vehicle locations using the identity of the vehicle as an index;
comparing the current geographical location of the tablet computing device to the geographical location reported by the vehicle; and
determining the current geographical location of the vehicle to be the current geographical location of the tablet computing device responsive to determining that the geographical location reported by the vehicle is within a predetermined distance of the current geographical location of the tablet computing device.

16. The non-transitory computer-readable medium of claim 14 wherein the instructions further cause the processing circuitry to determine a current geographical location of the tablet computing device.

17. The non-transitory computer-readable medium of claim 16 wherein the instructions further cause the processing circuitry to receive the current geographical location of the tablet computing device via a communications network.

18. The non-transitory computer-readable medium of claim 16 wherein the instructions further cause the processing circuitry to determine the current geographical location of the vehicle based on an identity of the vehicle.

19. The non-transitory computer-readable medium of claim 16 wherein to determine a reference point for the vehicle, the instructions further cause the processing circuitry to:
determine an identity of the vehicle being displayed to the user based on the current geographical location of the tablet computing device; and
determine the reference point based on the current geographical location of the vehicle, wherein the reference point indicates a point of origin for the 3D coordinate system generated for the vehicle.

20. The non-transitory computer-readable medium of claim 19 wherein to identify the one or more areas of interest on the vehicle, the instructions further cause the processing circuitry to calculate a corresponding geographical location for each of the one or more areas of interest relative to the reference point.

* * * * *